United States Patent [19]

Inoue

[11] Patent Number: 5,055,530

[45] Date of Patent: Oct. 8, 1991

[54] EPOXY RESIN-MODIFIED POLYAMIDE RESIN

[75] Inventor: Hiroshi Inoue, Hiratsuka, Japan

[73] Assignee: Kansai Paint Company Limited, Amagasaki, Japan

[21] Appl. No.: 378,742

[22] Filed: Jul. 12, 1989

[30] Foreign Application Priority Data

Jul. 13, 1988 [JP] Japan .................................. 63-174333
Sep. 12, 1988 [JP] Japan .................................. 63-228112

[51] Int. Cl.$^5$ ...................... C08L 77/06; C08L 77/08
[52] U.S. Cl. .................................... 525/423; 525/420.5
[58] Field of Search ................... 525/423, 420.5, 449; 528/111

[56] References Cited

U.S. PATENT DOCUMENTS

| | | | |
|---|---|---|---|
| Re. 30,264 | 4/1980 | Schimmel | 528/111 |
| 2,994,673 | 7/1961 | Capron et al. | 528/111 |
| 3,576,903 | 4/1971 | Groff | 525/423 |
| 3,647,728 | 3/1972 | Deflorin et al. | 525/420.5 |
| 3,657,380 | 4/1972 | Fang | 525/423 |
| 4,036,795 | 7/1977 | Tominaga | 525/423 |
| 4,574,146 | 3/1986 | Kordomenos | 528/111 |

*Primary Examiner*—John C. Bleutge
*Assistant Examiner*—Robert E. L. Sellers, II
*Attorney, Agent, or Firm*—Armstrong, Nikaido, Marmelstein, Kubovcik & Murray

[57] ABSTRACT

The present invention discloses a curable coating composition characterized in that the composition comprises as a vehicle component a nitrogen-containing resin modified with an epoxy resin and obtained by subjecting to a condensation reaction a polybasic acid compound and an amine compound having at least two active hydrogen atoms in the molecule on the average which atoms are reactive with the carboxyl group of the polybasic acid compound, without or along with a polyhydric alcohol and/or a fatty acid, and modifying the resulting nitrogen-containing resin with the epoxy resin.

8 Claims, No Drawings

EPOXY RESIN-MODIFIED POLYAMIDE RESIN

BACKGROUND OF THE INVENTION

The present invention relates to curable coating compositions, and more particularly to curable coating compositions comprising as a vehicle component a nitrogen-containing condensation resin having nitrogen atoms in its main skeleton.

Alkyd resin coating compositions are in wide use which comprise as a vehicle component an alkyd resin prepared from a polybasic acid and a polyhydric alcohol (further in combination with a fatty acid for modifying the resin when desired) by subjecting these compounds to a condensation reaction. These compositions are available at a low cost and excellent in coating operation efficiency, adhesion to substrates and bulky appearance (especially when finished in a solid color).

With rapid technical innovation, improved properties are inevitably required of coating compositions at present.

Alkyd resin coating compositions are still low in pigment dispersibility and pigment dispersion stability and therefore have the drawbacks that the coating obtained is inferior in gloss, distinctness-of-image gloss and finished appearance and also in properties such as adhesion, corrosion resistance, chemical resistance and mechanical characteristics. It has been required to remedy these drawbacks.

We have already proposed a curable coating composition comprising as a vehicle component a nitrogen-containing alkyd resin which has nitrogen atoms introduced into its main skeleton by using a alkalonol amine having at least two hydroxyl groups in the molecule as a portion or the whole of the polyhydric alcohol serving as one of the components of the alkyd resin (Japanese unexamined publication No.28562/1986). Said coating composition can somewhat attain the improvement in the above drawbacks of the alkyd resin coating compositions, but remains to be improved in the properties of coatings such as corrosion resistance, mechanical characteristics, etc.

In recent years, on the other hand, cationic electrodeposition coating compositions have been generally used in place of anionic electrodeposition coating compositions because these cationic compositions form cured coatings having substantially excellent corrosion resistance due to the mechanism of electrodeposition and the basic properties of their resin component. Among cationic coating compositions, widely used are those comprising as the base resin an epoxy resin having cationic groups introduced therein since the coating formed has high corrosion resistance. However, these compositions have the problem of being costly and having low weather resistance. Accordingly, it has been desired to provide cationic electrodeposition coating compositions of the water-soluble alkyd resin type which are less costly, whereas alkyd resin compositions generally have the foregoing drawbacks. Further cationic electro-deposition coating compositions which comprise water-soluble alkyd resin such as amino alkyd resin having hydroxyl and like cationic groups and curing agent are low in corrosion resistance and in the chemical and mechanical properties of coatings. Thus, cationic electrodeposition coating compositions of the alkyd resin type which are free of such drawbacks still remain to be provided.

SUMMARY OF THE INVENTION

Accordingly, an object of the present invention is to provide a curable coating composition capable of giving coatings which are excellent in corrosion resistance and mechanical characteristics.

Another object of the invention is to provide a cationic electrodeposition coating composition capable of forming coatings which are excellent in curability, corrosion resistance and mechanical characteristics.

Still another object of the invention is to provide a curable coating composition which is excellent in pigment dispersibility and pigment dispersion stability, therefore excellent in the finished appearance of coatings and also excellent in the adhesion, corrosion resistance, chemical resistance and mechanical characteristics of the coatings obtained.

The present invention provides a curable coating composition characterized in that the composition comprises as a vehicle component a nitrogen-containing resin modified with an epoxy resin and obtained by subjecting to a condensation reaction a polybasic acid compound and an amine compound having at least two active hydrogen atoms in the molecule on the average which atoms are reactive with the carboxyl group of the polybasic acid compound, without or along with a polyhydric alcohol and/or a fatty acid, and modifying the resulting nitrogen-containing resin with the epoxy resin.

In the course of research, we prepared a nitrogen-containing resin by subjecting to a condensation reaction a polybasic acid compound and an amine compound having at least two active hydrogen atoms in the molecule on the average, and when required, a polyhydric alcohol and/or a fatty acid, the hydrogen atoms being reactive with the carboxyl group of the polybasic acid compound, and further modified the nitrogen-containing resin with an epoxy resin. We have found that the epoxy-modified nitrogen-containing resin, having the structure wherein the epoxy resin is chemically attached to the nitrogen-containing resin, forms coatings which are exceedingly higher in corrosion resistance and mechanical properties than those prepared from the unmodified nitrogen-containing resin, and that the coating composition of the invention is advantageously usable for applications in which high corrosion resistance and high mechanical properties are required of coatings. Moreover, the epoxy-modified nitrogen-containing curable coating composition of the invention fully retains the advantages of the coating composition of nitrogen-containing resin which is not modified with the epoxy resin. Thus, the present composition is excellent in pigment dispersibility and pigment dispersion stability and gives coatings which are excellent in finished appearance, e.g. in gloss and distinctness-of-image gloss, and outstanding in adhesion and chemical resistance. The present curable coating composition is used, for example, in the form of a cationic electrodeposition coating composition which is excellent in storage stability and form coatings which are excellent in curability, corrosion resistance, weather resistance and mechanical characteristics. Additionally, the epoxy-modified nitrogen-containing resin of the invention does not comprise the epoxy resin as its base resin and is therefore available economically advantageously at a low cost.

PREFERRED EMBODIMENT OF THE INVENTION

The epoxy-modified nitrogen-containing resin serving as a vehicle component of the present coating composition is prepared by subjecting to a condensation reaction a polybasic acid compound and an amine compound as the essential components of the resin, and when required, a polyhydric alcohol and/or a fatty acid, and modifying the resulting resin with an epoxy resin.

The polybasic acid compound comprises a polyvalent carboxylic acid having at least two carboxyl groups in the molecule. The term "carboxyl group" as used herein and in the appended claims includes carboxyl and anhydrous carboxyl. Examples of useful polybasic acids are saturated aliphatic dibasic acid compounds such as succinic acid, adipic acid, azelaic acid, sebacic acid, dodecynylsuccinic acid and anhydrides of these acids; unsaturated aliphatic dibasic acid compounds such as maleic acid, fumaric acid, itaconic acid and anhydrides of these acids; aromatic polybasic acid compounds such as phthalic acid, isophthalic acid, terephthalic acid, trimellitic acid, pyromellitic acid and anhydrides of these acids; alicyclic polybasic acid compounds such as tetrahydrophthalic acid, methylcyclohexenetricarboxylic acid, hexahydrophthalic acid, endomethylenephthalic acid, hexachloroendomethylenetetrahydrophthalic acid, tetrachlorophthalic acid, cyclohexanedicarboxylic acid, methylhexahydrophthalic acid, hexahydrotrimellitic acid and anhydrides of these acids; etc. Among these polybasic acid compounds, especially preferable are adipic acid, phthalic acid, isophthalic acid, terephthalic acid, tetrahydrophthalic acid and anhydrides of these acids. At least one of the polybasic acid compounds can be used.

The amine compound to be reacted with the polybasic acid compound has active hydrogen reactive with the carboxyl of the polybasic acid compound. The amine compound has at least two, preferably 2 to 6, active hydrogen atoms in the molecule on the average. The active hydrogen atom means one contained in a functional group such as OH, NH (secondary amino in C—NH—C bond) or $NH_2$ (primary amino in C—$NH_2$ bond).

Given below are typical examples of such amine compounds:

Amine compounds having primary amino and/or secondary amino and represented by the formula (I)

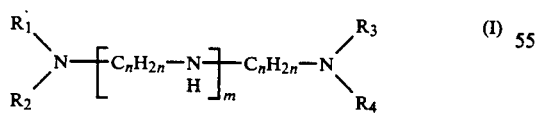

wherein $R_1$, $R_2$, $R_3$ and $R_4$ are the same or different and are each a hydrogen atom, alkyl, aryl or cycloalkyl, n is an integer of 1 to 4, and m is an integer of 0 to 4, provided that when m is 0, at least two of $R_1$, $R_2$, $R_3$ and $R_4$ are each a hydrogen atom or that when m is 1 at least one of $R_1$, $R_2$, $R_3$ and $R_4$ is a hydrogen atom;

Alkanol amine compounds having one hydroxyl group, and primary amino or secondary amino in the molecule and represented by the formula (II)

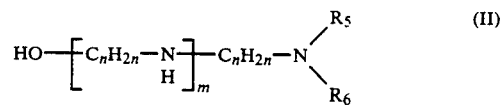

wherein $R_5$ and $R_6$ are the same or different and are each a hydrogen atom, alkyl, aryl or cycloalkyl, and n and m are as defined above, provided that when m is 0, at least one of $R_5$ and $R_6$ is a hydrogen atom; and Polyvalent alkanol amine compounds having at least two hydroxyl groups in the molecule and represented by the formula (III)

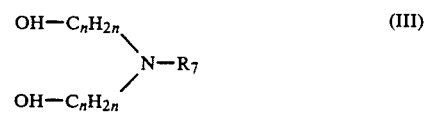

wherein $R_7$ is a hydrogen atom, alkyl, aryl, cycloalkyl or —$C_nH_{2n}$—OH group, and n is as defined above.

Examples of alkyl groups in the formulae (I), (II) and (III) are methyl, ethyl, n-propyl, isopropyl, n-butyl, isobutyl, sec-butyl, tert-butyl, n-hexyl, 2- 2-ethylhexyl, lauryl and the like, among which $C_{1-4}$ lower alkyl groups are desirable. Preferable example of cycloalkyl is cyclohexyl. Examples of aryl groups are phenyl, toluyl, xylyl and the like.

More specific examples of amine compounds of the formula (I) are:
$NH_2$—$C_2H_4$—$NH_2$,
$NH_2$—$C_2$—$H_4$—NH—$C_2H_4$—$NH_2$,
$NH_2$—$(C_2H_4$—NH$)_2$—$C_2H_4$—$NH_2$,
$NH_2$—$C_3H_6$—NH—$C_3H_6$—$NH_2$,
$(C_2H_5)_2$—N—$C_3H_{76}$—$NH_2$ and like.

Examples of useful amine compounds of the formula (II) are:

OH—$CH_2$—$NH_2$,
OH—$C_2H_4$—$NH_2$,
OH—$CH_2$—NH—$CH_3$,
OH—$C_2H_4$—NH—$CH_3$,
OH—$C_2H_4$—NH—$C_2H_5$,
OH—$C_2H_4$—NH—$C_3H_7$,
OH—$C_2H_4$—NH—$C_2H_4CH_3$,
OH—$C_2H_4$—NH—$C_4H_9$,

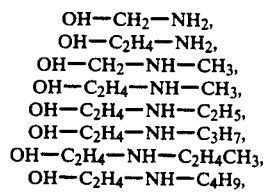

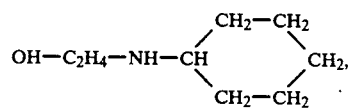

OH—$C_3H_6$—$NH_2$,
OH—$C_3H_6$—NH—$CH_3$,
OH—$C_3H_6$—NH—$C_2H_5$,
OH—$C_3H_6$—NH—$C_3H_7$,
OH—$C_3H_6$—NH—$C_2H_4CH_3$,
OH—$C_3H_6$—NH—$C_4H_9$,

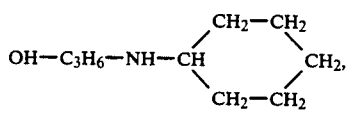

-continued

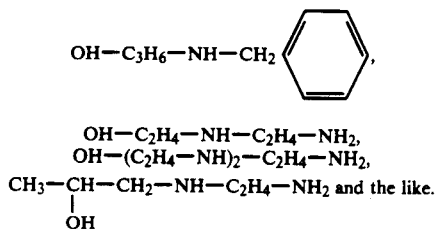

OH—C₂H₄—NH—C₂H₄—NH₂,
OH—(C₂H₄—NH)₂—C₂H₄—NH₂,
CH₃—CH—CH₂—NH—C₂H₄—NH₂ and the like.
  |
  OH Examples of useful amine compounds of the formula (III) are:

(OH—C₂H₄)₂—NH,
(CH₃—CH—CH₂)₂—NH,
      |
      OH

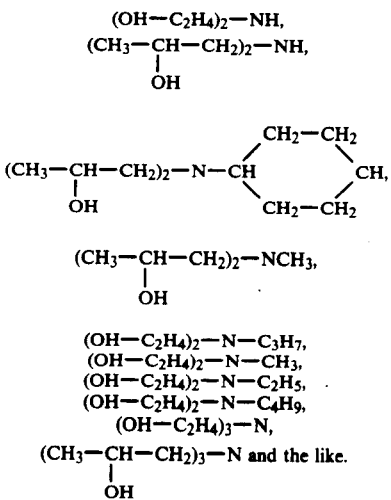

(CH₃—CH—CH₂)₂—NCH₃,
      |
      OH (OH—C₂H₄)₂—N—C₃H₇,
(OH—C₂H₄)₂—N—CH₃,
(OH—C₂H₄)₂—N—C₂H₅,
(OH—C₂H₄)₂—N—C₄H₉,
(OH—C₂H₄)₃—N,
(CH₃—CH—CH₂)₃—N and the like.
      |
      OH Among the amine compounds of the formulae (I) to (III), especially preferable are alkanol amine compounds of the formulae (II) and (III).

The polybasic acid compound and the amine compound to be subjected to a condensation reaction are used in the polybasic acid compound/amine compound mole ratio of from about 0.5 to about 1.2, preferably about 0.7 to about 1.0. Based on the combined amount of the polybasic acid compound and the amine compound (and the polyvalent alcohol and/or fatty acid when these compounds are used), the proportion of the amine compound is preferably about 0.5 to about 55 wt. %, more preferably about 0.5 to about 40 wt. %, most preferably about 1 to about 30 wt. %, to ensure excellent properties in respect of pigment dispersibility, resistance to hydrolysis, weather resistance and adhesion to substrates.

Especially when an aqueous coating composition such as cationic electrodeposition coating composition is to be obtained, the proportion of the amine compound to be used is preferably about 3 to about 55 wt. %, more preferably about 5 to about 40 wt. %, based on the combined amount of the polybasic acid compound and the amine compound (and the polyvalent alcohol and/or fatty acid when these compounds are used). If the proportion of the amine compound is less than about 3 wt. %, the coating composition is low in solubility in water and in the corrosion resistance of the coating obtained, whereas if it is more than about 55 wt. %, the coating exhibits low resistance to weather and water, hence undesirable.

When required, a polyhydric alcohol and/or a fatty acid can be subjected to a condensation reaction along with the polybasic acid compound and the amine compound to obtain a nitrogen-containing resin. The polyhydric alcohol is used as an active hydrogencontaining compound in order to adjust the amine value of the resulting resin. The fatty acid is used to improve mechanical properties and adhesion to substrates of the coatings. The polyhydric alcohol to be used is an aliphatic or alicyclic alcohol having 2 to 6 hydroxyl groups in the molecule. Examples of such alcohols are ethylene glycol, diethylene glycol, triethylene glycol, propylene glycol, dipropylene glycol, butanediol, neopentyl glycol, 1,2-, 1,3-, 2,3- and 1,4-butylene glycols, pentanediol, 2,3-dimethylpropanediol, 1,6- and 2,5-hexanediols, hydrogenated bisphenol A, cyclohexane dimethanol, trimethylene glycol, hexamethylene glycol, trimethylolethane, trimethylolpropane, glycerin, diglycerin, pentaerythritol, dipentaerythritol, sorbitol and the like. One or at least two of these alcohols are usable. Among these polyhydric alcohols, especially desirable are ethylene glycol, diethylene glycol, triethylene glycol, propylene glycol, dipropylene glycol, butanediol, neopentyl glycol, butylene glycols, pentanediol, hexanediols, hexamethylene glycol, trimethylolethane, trimethylolpropane, glycerin, diglycerin, pentaerythritol, dipentaerythritol, etc. The polyhydric alcohol is used in a proportion of about 2 to about 60%, preferably about 5 to about 40%, based on the combined amount by weight of the polybasic acid compound, amine compound, polyhydric alcohol and fatty acid.

Examples of useful fatty acids are drying oils (including semi-drying oils), fatty acids thereof (at least about 100 in iodine value), non-drying oils, fatty acids thereof (less than about 100 in iodine value), etc. Examples of useful drying oils and fatty acids thereof are safflower oil (fatty acid), linseed oil (fatty acid), soybean oil (fatty acid), sesame oil (fatty acid), poppy seed oil (fatty acid), perilla oil (fatty acid), hemp seed oil (fatty acid), grapeseed oil (fatty acid), corn oil (fatty acid), sunflower oil (fatty acid), cotton seed oil (fatty acid), walnut oil (fatty acid), tung oil (fatty acid), dehydrated castor oil (fatty acid), rice bran (fatty acid) and like oils or fatty acids, tall oil fatty acid, etc. Also usable are dimer acids of these fatty acids. Examples of useful non-drying oils or fatty acids thereof include coconut oil (fatty acid). Use of the (semi-)drying oil or fatty acid thereof is advantageous in that the composition can be dried in air. Especially preferable among these fatty acids are safflower oil, linseed oil, soybean oil, sesame oil, sunflower oil, cotton seed oil, tung oil, rice bran oil and their fatty acids and tall oil fatty acid, coconut oil (fatty acid), etc. The fatty acid is used in an amount of about 0 to about 60 wt. %, preferably about 5 to about 60 wt. %, more preferably about 10 to about 45 wt. %, based on the combined amount of the polybasic acid compound, amine compound, polyhydric alcohol and fatty acid. When the (semi-)drying oil or fatty acid thereof is used to render the composition dryable in air, the acid is used in an amount of about 20 to about 60 wt.%.

The nitrogen-containing resin can be prepared by reacting the polybasic acid compound and amine compound, along with the polyhydric alcohol and fatty acid when required, under the same conditions as when preparing usual alkyd resins, for example, at about 150 to about 250° C. for about 1 to about 15 hours.

The nitrogen-containing resin can be about 200 to about 5000, preferably about 300 to about 3000, in number average molecular weight.

The epoxy resins for modifying the nitrogencontaining resins include polyepoxides having at least two epoxy groups per molecule on the average, and epoxides obtained by modifying such a polyepoxide with a monobasic acid and having at least one epoxy group per molecule on the average. The epoxide is preferably about 320 to about 8000 in number average molecular weight. More preferably, the epoxide has a number average molecular weight of at least 800 to assure the coating of improved corrosion resistance and mechanical characteristics but not greater than about 4000 to form coatings having a good appearance. Examples of useful polyepoxides are epoxy resins obtained from bisphenol and epihalohydrin, and epoxy resins prepared from hydrogenated bisphenol and epihalohydrin, or from bisphenol and epihalohydrin. Of these, especially desirable are epoxy resins obtained from bisphenol and epihalohydrin. More specifically, these resins are available under the brand names of Epikote 828, Epikote 812, Epikote 152, Epikote 154, Epikote 1001, Epikote 1002, Epikote 1003, Epikote 1055, Epikote 1004, Epikote 1007, Epikote 1009 and Epikote 1010 which are products of Shell Chemical; Araldite 6071, Araldite 6084, Araldite 6097, Araldite 6099 and Araldite 7004 which are products of CIBA-GEIGY LTD.; EPICLON N-730 and EPICLON N-740 which are products of Dainippon Ink & Chemicals Inc; etc.

Besides these, also usable are:
a) polyglycidyl ethers of novolak resins,
b) polyglycidyl ethers of polyhydric alcohols such as ethylene glycol, propylene glycol, glycerin, trimethylolpropane and the like,
c) polyglycidyl ethers of polycarboxylic acids such as adipic acid, phthalic acid, dimer acid and the like, and
d) polyepoxides obtained by epoxidizing alicyclic olefins or 1,2-polybutadiene.

It is desirable to use these polyepoxides in combination with the above epoxy resin in an amount of up to about 50 parts by weight per 100 parts by weight of the epoxy resin.

Examples of monobasic acids useful for modifying the polyepoxide are fatty acids for use in preparing the nitrogen-containing resin.

The epoxy resin is used in an amount of about 1 to about 50 parts by weight, preferably about 3 to about 30 parts by weight, per 100 parts by weight of the nitrogen-containing resin. When the amount is less than about 1 part by weight, the coating obtained will not be satisfactory in properties such as adhesion to the substrate, corrosion resistance, chemical resistance and flexibility, whereas if the amount exceeds about 50 parts by weight, impaired pigment dispersibility will result, creating faults such as seediness, color separation and decreasing of gloss in the coating and further permitting the pigment component to separate from the resin component during storage of the composition to settle on the bottom of the container and become difficult to disperse again owing to hard caking, hence undesirable.

The epoxy-modified nitrogen-containing resin for use in the present invention can be prepared by subjecting the nitrogen-containing resin and the epoxy resin to an addition reaction under conditions already known (for reacting the epoxy group(s) with the carboxyl groups or amino groups), i.e., usually at about 130 to about 200° C. for about 1 to about 6 hours.

When required, a carboxyl group can be introduced into the epoxy-modified nitrogen-containing resin by a usual method, for example, by admixing a carboxylic anhydride (such as maleic, phthalic, itaconic or succinic anhydride) with the resin and reacting the hydroxyl group in the resin with the anhydrous carboxyl group for half-esterification.

The curable coating composition of the invention can be in the form of an organic solvent system wherein an organic solvent is used chiefly as the solvent (or dispersant or diluent), or of an aqueous system wherein water is chiefly used as the solvent, dispersant or diluent (and which may contain a small amount of organic solvent). It is desirable to prepare the epoxy-modified nitrogen-containing resin in accordance with the system to be obtained. More specifically, for use in the organic solvent system, it is desirable to adjust the resin to a hydroxyl value of about 30 to about 200, especially about 30 to about 150, and to an acid value of up to about 50, especially up to about 30. For use in the aqueous system, the resin is adjusted preferably to a hydroxyl value of about 30 to about 200, especially about 30 to about 150 and to an acid value of about 10 to about 200.

When prepared as modified with a fatty acid (especially with a drying or semi-drying oils and fatty acids thereof), the epoxy-modified nitrogen-containing resin is capable of forming cured coatings singly without the presence of the below-mentioned crosslinking agent admixed therewith.

The curable coating composition of the invention can be adapted to cure through crosslinking on heating to form a three-dimensional network structure when a crosslinking agent is admixed with the epoxy-modified nitrogen-containing resin. The crosslinking agent is a compound having a functional group (such as methylol, alkylether, isocyanate or like group) which undergoes a crosslinking reaction with the hydroxyl groups in the nitrogen-containing resin. Examples of such compounds are amino resins such as urea resin, benzoguanamine resin, melamine resin which is methylolated or alkyletherified as modified with at least one of monohydric alcohols having 1 to 5 carbon atoms. Examples of useful polyisocyanate compounds are tolylene diisocyanate, adduct of tolylene diisocyanate with trimethylolpropane, diphenylmethane diisocyanate, methylene diisocyanate, hexamethylene diisocyanate, adduct of hexamethylene diisocyanate and trimethylolpropane, xylylene diisocyanates, lysine diisocyanate and the like. These compounds may have their isocyanate groups blocked with a blocking agent. Examples of such blocking agents are phenol, thiourea, methanol, propanol, n-butanol, tert-butanol, ethyl acetoacetate, dimethyl malonate, $\epsilon$-caprolactam, methyl ethyl ketone and the like.

The proportions of the epoxy-modified nitrogen-containing resin and the crosslinking agent for forming the curable coating composition of the invention are preferably about 95 to about 60 wt. %, especially about 85 to about 65 wt. %, of the resin, and about 5 to about 40 wt. %, especially about 15 to about 35 wt. %, of the crosslinking agent.

The curable coating composition of the invention is in the form of a liquid composition containing an organic solvent and/or water serving as the solvent or dispersant or the like. The organic solvent system is prepared by dissolving or dispersing the resin in an organic solvent usually used for coating compositions. Examples of useful organic solvents are hydrocarbons such as toluene, xylene, naphtha, mineral spirit, octane and cyclohexane; alcohols such as methanol, ethanol, butanol, cyclohexanol and heptanol; ethers such as dioxane, methyl cellosolve, butyl cellosolve, methyl carbitol and butyl carbitol; esters such as ethyl acetate, butyl acetate, methyl cellosolve acetate, cellosolve acetate and carbitol acetate; ketones such as methyl ethyl ketone, methyl isobutyl ketone, cyclohexanone and isophorone; etc. The aqueous coating composition is prepared by neutralizing the nitrogen-containing resin with a basic substance and dissolving or dispersing the neutralized resin in water (which may contain an organic solvent). Examples of useful basic substances are amine compounds such as trimethylamine, triethylamine, monoethanolamine, diethanolamine, triethanolamine, dimethylethanolamine, diethylethanolamine and morpholine, hydroxides such as caustic soda and caustic potash, ammonia and the like.

In addition to the foregoing components, coloring pigments, extender pigments, metallic pigments, antisagging agents, curing accelerators and the like which are already known can be incorporated into the curable coating composition of the invention.

The curable coating composition of the invention can be applied by brush coating, flow coating, (air or airless) spray coating, electrostatic coating, dip coating, curtain flow coating, electrodeposition coating or like method. The nonvolatile concentration of the composition to be applied may vary widely over the range of about 10 to about 70 wt. %. To be suitable, the composition is applied to a thickness of about 15 to about 40 μm when dried. The coating is cured at room temperature of with heating (usually at about 100 to about 200° C. for about 10 to about 40 minutes). Examples of substrates to be coated are untreated metals, metals surface-treated with a phosphate, chromate or the like, substrates having a primer, intermediate or top coat, plastics (especially polyamide resin), wood, glass, etc.

The curable coating composition of the invention is usable, for example, in the form of a cationic electrodeposition coating composition, which can be prepared by neutralizing the basic group of the epoxymodified nitrogen-containing resin with an acid agent and thereafter dispersing the resin in water, or by quaternizing some or all of the nitrogen atoms of the epoxy-modified nitrogen-containing resin with an epoxycontaining resin or compound such as epoxy resin or glycidyl ether and thereafter dispersing the resin in water.

To give improved water-dispersibility to the epoxy-modified nitrogen-containing resin, a cationic group can be imparted to the terminal end of the resin.

When providing the electrodeposition coating composition, the epoxy-modified nitrogen-containing resin preferably has an amine value of about 10 to about 200, more preferably about 30 to about 150. If the amine value is lower than about 10, the resin is low in water-dispersibility, whereas if it is greater than about 200, the coating exhibits reduced weather resistance.

Examples of suitable acid agents for neutralizing the resin are formic acid, acetic acid, hydroxyacetic acid, propionic acid, dimethylolpropionic acid, butyric acid and the like. The acid neutralizing agent is used in an amount of about 0.2 to about 1.5 equivalents, preferably about 0.3 to about 1.0 equivalent, based on the basic group of the resin.

Like usual curable coating compositions, the electrodeposition coating composition of the invention can be adapted to cure through three-dimensional network structure crosslinking on heating or drying at room temperature when containing a crosslinking agent as admixed with the epoxy-modified nitrogen-containing resin. The same crosslinking agents as already mentioned are usable.

Preferably, the proportions of the epoxy-modified nitrogen-containing resin and the crosslinking agent forming the electrodeposition coating composition of the invention are about 100 to about 60 wt. %, especially about 85 to about 70 wt. %, of the resin and 0 to about 40 wt. %, especially about 15 to about 30 wt. %, of the agent, based on the combined amount of the two components.

When as the aforementioned crosslinking agent the crosslinking resin such as melamine resin, urea resin, benzoguanamine resin and polyisocyanate compound blocked with a blocking agent is admixed with the epoxy-modified nitrogen-containing resin having the functional group of OH to make the resulting electrodeposition coating composition curable through crosslinking when heated, it is desirable that the epoxy-modified nitrogen-containing resin have a hydroxyl value of about 20 to about 300, preferably about 30 to about 200, and an acid value of about 0.5 to about 50, preferably about 1 to about 25. The composition can be fully cured when heated at about 120 to about 200° C. for about 10 to about 40 minutes.

In addition to the components stated above, coloring pigments, extender pigments, corrosion inhibitory pigments, leveling agents, curing accelerators, hydrophilic organic solvents and the like which are already known can be incorporated into the electrodeposition coating composition of the invention.

Substrates can be coated with use of the present electrodeposition coating composition, for example, by preparing an electrodeposition bath having a solids concentration of about 5 to about 30 wt. %, applying a voltage across an anode and the substrate immersed in the bath and serving as a cathode at a bath temperature of about 5 to about 30° C. to form a coating on the substrate, and drying the coating at room temperature or baking the coating (for example at about 40 to about 200° C. for about to about 40 minutes). The substrate is not limited specifically insofar as it is electrically conductive. Examples of such substrates are iron or steel plates, aluminum plates, alloy plates (ternesheets or the like), iron or steel plates or sheets plated with zinc, tin, chrominum, aluminum or the like, iron plates surface-treated with phosphoric acid, zinc phosphate, iron phosphate

EXAMPLES

The present invention will be described in more detail with reference to preparation examples, examples and comparative examples.

In the specification the acid value, hydroxyl value and amine value have the meanings given below.

Acid value: the amount (mg) of potassium hydroxide required to neutralize 1 g of resin.

Hydroxyl value: calculated by dividing 56100 by the amount (g) of resin containing one equivalent of hydroxyl group.

Amine value: A 0.2 to 0.3 g quantity of the test sample was placed into a 100-ml Erlenmeyer flask and heated for melting. The melted substance was cooled and titrated with 1/10 N aqueous HCl solution using bromophenol blue as an indicator, and the end point of titration was defined as the point wherein the color of liquid changed from blue to yellow. The amine value was calculated from the following equation:

$$\text{Amine value} = \frac{\text{Amount of N/10 HCl (ml)} \times \text{Titer of N/10 HCl} \times 56.1}{\text{Amount of sample (g)} \times \text{solids content (\%)} \times 1/100}$$

PREPARATION EXAMPLE 1

A mixture of 7.3 parts by weight of ethylene glycol, 5.2 parts by weight of methylpropanol amine, 16.4 parts by weight of pentaerythritol, 17.1 parts by weight of adipic acid, 24.3 parts by weight of isophthalic acid, 16.4 parts by weight of tall oil fatty acid and 3 parts by weight of xylene was reacted at 160 to 230° C. in an atmosphere of nitrogen gas for 12 hours with stirring, and 4.8 parts by weight of Epikote 1001 (product of Shell Chemical Co.,Ltd.) was added thereto. The mixture was reacted at 160° C. for 4 hours, and subjected to half esterification reaction with 8.7 parts by weight of phthalic anhydride. Epoxy-modified nitrogen-containing alkyd resin (A-1) to be used in the invention was thus prepared. Resin (A-1) had a hydroxyl value of 70, acid value of 43 and amine compound content of 6.0 wt. %. The ratio of nitrogen-containing alkyd resin to epoxy resin in Resin (A-1) was 100 : 5.0.

PREPARATION EXAMPLE 2

A mixture of 20.4 parts by weight of trimethylolpropane, 8.5 parts by weight of ethyldipropanolamine, 30.0 parts by weight of phthalic anhydride, 29.9 parts by weight of linseed oil fatty acid and 3 parts by weight of xylene was reacted at 160 to 230° C. for 12 hours with stirring in an atmosphere of nitrogen, and 16.7 parts by weight of Epikote 1004 (product of Shell Chemical Co., Ltd.) was added thereto. The mixture was reacted at 160° C. for 4 hours to give epoxy-modified nitrogen-containing alkyd resin (A-2). Resin (A-2) had a hydroxyl value of 45, acid value of 8 and amine compound content of 9.5 wt. %. The ratio of nitrogen-containing alkyd resin to epoxy resin in Resin (A-2) was 100 : 18.8.

PREPARATION EXAMPLE 3

A mixture of 24.2 parts by weight of neopentyl glycol, 8.7 parts by weight of triethanolamine, 30.4 parts by weight of phthalic anhydride, 23.7 parts by weight of soybean oil fatty acid and 3 parts by weight of xylene was reacted at 160° to 230° C. for 12 hours with stirring in an atmosphere of nitrogen, and 13.0 parts by weight of Epikote 1007 (product of Shell Chemical Co., Ltd.) was added thereto. The mixture was reacted at 160° C. for 4 hours to give epoxy-modified nitrogen-containing alkyd resin (A-3). Resin (A-3) had a hydroxyl value of 110, acid value of 3 and amine compound content of 10 wt. %. The ratio of nitrogen-containing alkyd resin to epoxy resin was 100 : 15.

PREPARATION EXAMPLE 4

A mixture of 14.3 parts by weight of tripropanolamine, 7.9 parts by weight of ethyldiethanolamine. 23.6 parts by weight of neopentyl glycol and 54.2 parts by weight of tetrahydrophthalic anhydride was reacted at 160° to 230° C. for 9 hours with stirring, and 20 parts by weight of Epikote 1004 (product of Shell Chemical Co., Ltd.) was added thereto. The mixture was reacted at 160° C. for 5 hours to give epoxy-modified nitrogen-containing alkyd resin (A-4). Resin (A-4) had amine compound content of 22.2 wt. % and acid value of 0. The ratio of nitrogen-containing alkyd resin to epoxy resin in Resin (A-4) was 100 : 20.

PREPARATION EXAMPLE 5

A mixture of 27.8 parts by weight of neopentyl glycol, 9 parts by weight of trimethylolpropane, 35 parts by weight of phthalic anhydride, 27.2 parts by weight of soybean oil fatty acid and 3 parts by weight of xylene was reacted in the same manner as in Preparation Example 1 to give comparative alkyd resin (B-1).

Preparation Example 6

A mixture of 18.0 parts by weight of triethanolamine, 17.5 parts by weight of ethylene glycol, 47.6 parts by weight of phthalic anhydride and 16.9 parts by weight of coconut oil fatty acid was reacted at 160 to 230° C. for 10 hours in an atmosphere of nitrogen gas with stirring, and 23.1 parts by weight of Epikote 1001 (product of Shell Chemical Co., Ltd.) was added thereto. The mixture was reacted at 160° C. to 230° C. for 4 hours to give epoxy-modified nitrogen-containing alkyd resin (A-5). Resin (A-5) had an acid value of 2 and amine value of 66.4. The ratio of nitrogen-containing alkyd resin to epoxy resin was 100 : 23.1 (by weight).

PREPARATION EXAMPLE 7

A mixture of 11.3 parts by weight of methyldiethanolamine, 5.9 parts by weight of ethylene glycol, 11.7 parts by weight of glycerin, 44.5 parts by weight of phthalic anhydride and 26.6 parts by weight of tall oil fatty acid was reacted at 160 to 230° C. for 11 hours in an atmosphere of nitrogen gas with stirring, and 15 parts by weight of Epikote 1007 (product of Shell Chemical Co., Ltd.) was added thereto. The mixture was reacted at 160° C. for 5 hours to give epoxy-modified nitrogen-containing alkyd resin (A-6). Resin (A-6) had an acid value of 15 and amine value of 49.9, and the ratio of nitrogen-containing alkyd resin to epoxy resin was 100 : 15 (by weight).

PREPARATION EXAMPLE 8

To 100 parts by weight (solids content) of nitrogen-containing alkyd resin (A-5) prepared in Preparation Example 6, 7.8 parts by weight of acetic acid, 16.9 parts by weight of butyl glycidyl ether and 1.3 parts by weight of deionized water were added. The mixture was reacted at 80° C. for 2 hours to give quaternary ammonium salt (A-7) of resin (A-5).

PREPARATION EXAMPLE 9

2,4-Tolylene diisocyanate (87.1 parts by weight) was slowly added to 143 parts by weight of 2-ethylhexanol with cooling externally, and the reaction mixture was maintained at a temperature of less than 100° C. Blocked diisocyanate compound (C-1) was thus prepared

PREPARATION EXAMPLE 10

A mixture of 16.7 parts by weight of trimethylolpropane, 17.7 parts by weight of ethylene glycol, 48.4 parts by weight of phthalic anhydride and 17.2 parts by weight of coconut oil fatty acid was reacted at 160 to 230° C. for 10 hours in an atmosphere of nitrogen gas with stirring to give comparative alkyd resin (B-2). Resin (B-2) had an acid value of 2 and hydroxyl value of 125.7.

Preparation Example 11

Quaternary ammonium salt (A-7) (100 parts by weight) prepared in Preparation Example 8 was dissolved in 24 parts by weight of butyl cellosolve, and deionized water was added to the solution, affording an aqueous solution with a solids content of 20 wt. %.

Glass beads were placed into a mixture of 600 g of the above aqueous solution, 190 g of TIPAQUE R602 (product of Ishihara Sangyo Co., Ltd., Titanium oxide), 3.6 g of carbon black MA (product of Mitsubishi Kasei Industry Co.) and 107 g of aluminum silicate, followed by vigorous stirring for 2 hours with a high speed rotary mixer. Pigment paste (D-1) excellent in water-dispersibility was thus obtained.

PREPARATION EXAMPLE 12

A mixture of 8.3 parts by weight of ethylene glycol, 7.1 parts by weight of diethanolamine, 18.8 parts by weight of pentaerythritol, 20.0 parts by weight of adipic acid, 27.8 parts by weight of isophthalic acid, 18.8 parts by weight of tall oil fatty acid and 3 parts by weight of xylene was reacted in a nitrogen atmosphere with stirring at 160 to 230° C. for about 12 hours. Subsequently, 9.9 parts by weight of phthalic anhydride was reacted with the reaction mixture to effect addition by half-esterification to obtain a comparative nitrogen-containing alkyd resin (B-3) for use in the invention. The resin (B-3) was found to be 64 in hydroxyl value, 45 in acid value and 7% by weight in amine compound content.

EXAMPLE 1

Resin (A-1) prepared in Preparation Example 1 was subjected to equivalent neutralization with diethylamine ethanol to make said resin water-soluble. Subsequently, 25 parts by weight (solids content) of water-soluble methanol-modified melamine resin (Sumimal M-30W, product of Sumitomo Chemical Co., Ltd.), 125 parts by weight of titanium white (JR-600E, product of Teikoku Kako Co., Ltd.), butyl cellosolve and water were added to 100 parts by weight (solids content) of the neutralized resin. The mixture was treated for dispersion with a ball mill, giving coating composition 1 containing 50 wt. % of non-volatiles.

EXAMPLE 2

To 100 parts by weight (solids content) of resin (A-2) prepared in Preparation Example 2, 30 parts by weight (solids content) of butoxymelamine resin (UVAN 20SE, product of Mitsui Toatsu Chemicals, Inc.), 20 parts by weight of precipitated barium sulfate, 20 parts by weight of Mapico Yellow-XLO (product of Columbian Chemical Co.) and solvents (butanol and xylene) were added. The mixture was treated with a sand mill to give coating composition 2 containing 45 wt. % of non-volatile substance.

EXAMPLE 3

To 100 parts by weight of resin (A-3) prepared in Preparation Example 3, 25 parts by weight (solids content) of UVAN 20SE (product of Mitsui Toatsu Chemicals, Inc.), 6.25 parts by weight of carbon black MA (product of Mitsubishi Kasei Industry Co.) and solvents (isobutanol, xylene) were added. The mixture was treated with a ball mill to give coating composition 3 containing 55 wt. % of non-volatile substance.

COMPARATIVE EXAMPLE 1

Comparative coating composition 1 was prepared in the same manner as in Example 3 with the exception of using alkyd resin (B-1) prepared in Preparation Example 5 instead of resin (A-3).

EXAMPLE 4

Coating composition 4 was prepared in the same manner as in Example 1 with the exception of using epoxy-modified nitrogen-containing alkyd resin (A-4) instead of resin (A-1).

EXAMPLE 5

Resin (A-5) (100 parts by weight) prepared in Preparation Example 6 and 31.8 parts by weight of compound (C-1) prepared in Preparation Example 9 were dissolved in a mixture of 24 parts by weight of butyl cellosolve and 22.8 parts by weight of isopropanol, followed by neutralization with 7.8 parts by weight of acetic acid. Deionized water was added to the solution to prepare an aqueous dispersion with a solids content of 20 wt. %. To this dispersion was added 130 parts by weight of pigment paste (D-1) prepared in Preparation Example 11. Deionized water was added to the mixture to give an electro-deposition coating composition 5 with a solids content of 15 wt. %.

EXAMPLE 6

Resin (A-4) (100 parts by weight) prepared in Preparation Example 4 and 31.8 parts by weight of compound (C-1) prepared in Preparation Example 9 were dissolved in a mixture of 24 parts by weight of butyl cellosolve and 22.8 parts by weight of isopropanol, followed by neutralization with 7.8 parts by weight of acetic acid. Deionized water was added to the solution to prepare an aqueous dispersion having a solids content of 20 wt. %. To this dispersion was added 130 parts by weight of pigment paste (D-1) prepared in Preparation Example 11. Deionized water was added to the mixture to give an electrodeposition coating composition 6 of solids content of 15 wt. %.

EXAMPLE 7

Resin (A-4) (100 parts by weight) prepared in Preparation Example 4 and 30 parts by weight of melamine resin (NIKALACK MX40, Sanwa Chemical Co., Ltd.) were dissolved in a mixture of 24 parts by weight of butyl cellosolve and 22.8 parts by weight of isopropanol, followed by neutralization with 7.8 parts by weight of acetic acid. Deionized water was added to the solution to prepare an aqueous dispersion with a solids content of 20 wt. %. To this dispersion was added 130 parts by weight of pigment paste (D-1) prepared in Preparation Example 11. Deionized water was added to the mixture to give an electrodeposition coating composition 7 with a solids content of 15 wt. %.

COMPARATIVE EXAMPLE 2

Comparative resin (B-2) (100 parts by weight) prepared in Preparation Example 10, 31.8 parts by weight of compound (C-1) prepared in Preparation Example 9 and 130 parts by weight of pigment paste (D-1) prepared in Preparation Example 11 were mixed together, and the mixture was diluted to 30 wt. % with isopropanol, giving a comparative coating composition 2.

COMPARATIVE EXAMPLE 3

Comparative coating composition 3 was prepared in the same manner as in Example 3 with the exception of using alkyd resin (B-3) prepared in Preparation Example 12 instead of resin (A-3).

COMPARATIVE EXAMPLE 4

Comparative coating composition 3 having a nonvolatile content of 55 wt. % was diluted with water to give a non-volatile content of 15 wt. %, affording comparative coating composition 4.

PERFORMANCE TEST

Each of the coating composition obtained in Examples and Comparative Examples was applied to a steel plate treated with iron phosphate (Examples 1 to 4 and Comparative Examples 1 and 3) or zinc phosphate (Examples 5 to 7 and Comparative Examples 2 and 4) so as to form a coat of 25 to 30 μm in thickness when dried. The application of coating composition was performed by using a brush (Examples 1 to 4 and Comparative Examples 1 and 3) or by cationic electrodeposition (Examples 5 to 7 and Comparative Examples 2 and 4). The coated plate was baked for curing and tested for various properties. The results were shown below in Tables 1 and 2.

TABLE 1

| Coating Composition | EXAMPLE 1 | EXAMPLE 2 | EXAMPLE 3 | EXAMPLE 4 | COMPARATIVE EXAMPLE 1 | COMPARATIVE EXAMPLE 3 |
|---|---|---|---|---|---|---|
| Baking (30 min) | 140° C. | 130° C. | 140° C. | 140° C. | 140° C. | 140° C. |
| Coating thickness (μm) | 25 | 25 | 30 | 30 | 25 | 25 |
| Appearance*(1) | A | A | A | A | A | A |
| Gloss (60°) | 95 | 94 | 93 | 92 | 85 | 90 |
| Gloss (20°) | 84 | 82 | 80 | 80 | 75 | 80 |
| Corrosion Resistance*(2) | 0.5 mm | 1.0 mm | 1.0 mm | 1.0 mm | 5 mm< | 3.0 mm |
| Acid Resistance*(3) | A | A | A | A | B | B |
| Alkali Resistance*(4) | A | A | A | A | B | A |
| Bending Resistance*(5) | A | A | A | A | B | B |
| Pencil Hardness | 3H | H | 2H | 3H | HB | HB |
| Solvent Resistance*(6) | A | A | A | A | A | A |
| Adhesion*(7) | 100/100 | 100/100 | 100/100 | 100/100 | 40/100 | 100/100 |
| Recoatability*(8) | 100/100 | 100/100 | 100/100 | 100/100 | 60/100 | 100/100 |
| Stability*(9) | | | | | | |
| State of composition | A | A | A | A | B | A |
| Gloss (60°) | 94 | 90 | 91 | 90 | 69 | 88 |
| Gloss (20°) | 80 | 79 | 80 | 78 | 51 | 78 |

TABLE 2

| Coating Composition | EXAMPLE 5 | EXAMPLE 6 | EXAMPLE 7 | COMPARATIVE EXAMPLE 2 | COMPARATIVE EXAMPLE 4 |
|---|---|---|---|---|---|
| Baking (30 min) | 170° C. | 170° C. | 170° C. | 170° C. | 170° C. |
| Coating thickness (μm) | 25 | 30 | 30 | 25 | 25 |
| Appearance*(1) | A | A | A | A | A |
| Gloss (60°) | 87 | 88 | 91 | 82 | 86 |
| Corrosion Resistance*(2) | 0.5 mm | 0.5 mm | 1.0 mm | 4.0 mm< | 3.0 mm |
| Acid Resistance*(3) | A | A | A | B | B |
| Alkali Resistance*(4) | A | A | A | B | A |
| Bending Resistance*(5) | A | A | A | B | B |
| Pencil Hardness | 2H | 3H | H | HB | HB |
| Solvent Resistance*(6) | A | A | A | A | A |
| Adhesion*(7) | 100/100 | 100/100 | 100/100 | 40/100 | 95/100 |
| Stability*(9) | | | | | |
| State of composition | A | A | A | B | A |

TABLE 2-continued

| Coating Composition | EXAMPLE | | | COMPARATIVE EXAMPLE | |
|---|---|---|---|---|---|
| | 5 | 6 | 7 | 2 | 4 |
| Specular Gloss (60°) | 86 | 87 | 90 | 90 | 84 |

*(1)Appearance: The appearance was checked with the visually inspection for smoothness, cissing and uneveness.
*(2)Corrosion resistance: The coating was cut crosswise to the substrate surface and subjected to a salt spray test for 500 hours. An adhesive cellophane tape was adhered to the cut portion and peeled off. The width of the coating peeled off was measured across the cut line.
*(3)Acid resistance: 1/10 N $H_2SO_4$ aqueous solution was added dropwise onto the coating surface supported horizontally. The test plate was allowed to stand for 48 hours and checked for the appearance of coating.
A: No abnormality was observed.
B: Occurrence of whitening and/or reduction in brightness.
*(4)Alkali resistance: The test was conducted in the same manner as *3 with the exception of use of 1/5 N NaOH aqueous solution.
A: No abnormality was observed.
B: Occurrence of whitening and/or reduction in brightness was observed.
*(5)Bending resistance: The test plate was bent with the coating surface outside to a radius of curvature of 4 mm.
A: No abnormality was observed.
B: Occurrence of cracking and/or peeling was observed.
*(6)Solvent resistance: The coated plate was immersed in toluene (20° C.) for 5 hours to observe the appearance of coating.
A: No abnormality was observed.
*(7)Adhesion: The coated plate was immersed in water at 40° C. for 48 hours, taken out and allowed to stand for one hour. Then the plate was cut crosswise in the same manner as below in item *(8) to evaluate adhesion.
*(8)Recoatability: The coating composition was applied to the steel plate to form a coat of 30 μm in thickness and finished by baking at 30° C. The same coating composition was further applied to the coated plate to form a coat of 20 μm in thickness when cured and baked again at 120° C. for 30 minutes. Subsequently the coated plate was cut crosswise to the substrate surface to form 100 squares, 1 mm × 1 mm. An adhesive cellophane tape was adhered to the coating surface and peeled off to record the number of squares remaining on the surface.
*(9)Stability: The coating composition was checked for pigment precipitation after storing the composition at 40° C. (Examples 1 to 4 and Comparative Examples 1 and 3) or 30° C. (Examples 5 to 7 and Comparative Examples 2 and 4) for 20 days.
A: No abnormality was observed.
B: Precipitation of pigment was apparently observed.

(*1) Appearance: The appearance was checked with the visually inspection for smoothness, cissing and uneveness. (*2) Corrosion resistance: The coating was cut crosswise to the substrate surface and subjected to a salt spray test for 500 hours. An adhesive cellophane tape was adhered to the cut portion and peeled off. The width of the coating peeled off was measured across the cut line.

(*3) Acid resistance: 1/10 N $H_2SO_4$ aqueous solution was added dropwise onto the coating surface supported horizontally. The test plate was allowed to stand for 48 hours and checked for the appearance of coating.
A: No abnormality was observed.
B: Occurrence of whitening and/or reduction in brightness (*4) Alkali resistance: The test was conducted in the same manner as (*3) with the exception of use of 1/5 N NaOH aqueous solution.
A: No abnormality was observed.
B: Occurrence of whitening and/or reduction in brightness was observed.

(*5) Bending resistance: The test plate was bent with the coating surface outside to a radius of curvature of 4 mm.
A: No abnormality was observed.
B: Occurrence of cracking and/or peeling was observed (*6) Solvent resistance: The coated plate was immersed in toluene (20° C.) for 5 hours to observe the appearance of coating.
A: No abnormality was observed.

(*7) Adhesion: The coated plate was immersed in water at 40° C. for 48 hours, taken out and allowed to stand for one hour. Then the plate was cut crosswise in the same manner as below in item (*8) to evaluate adhesion.

(*8) Recoatability: The coating composition was applied to the steel plate to form a coat of 30 μm in thickness and finished by baking at 30° C. The same coating composition was further applied to the coated plate to form a coat of 20 μm in thickness when cured and baked again at 120° C. for 30 minutes.

Subsequently the coated plate was cut crosswise to the substrate surface to form 100 squares, 1mm × 1mm. An adhesive cellophane tape was adhered to the coating surface and peeled off to record the number of squares remaining on the surface.

(*9) Stability: The coating composition was checked for pigment precipitation after storing the composition at 40° C. (Examples 1 to 4 and Comparative Examples 1 and 3) or 30° C. (Examples 5 to 7 and Comparative Examples 2 and 4) for 20 days.
A: No abnormality was observed.
B: Precipitation of pigment was apparently observed.

I claim:

1. A curable coating composition characterized in that the composition comprises as a vehicle component a nitrogencontaining resin modified with an epoxy resin and having curable hydroxyl groups which is obtained by subjecting to a condensation reaction a polybasic acid compound and an amine compound having at least two active hydrogen atoms in the molecule on the average which atoms are reactive with the carboxyl group of the polybasic acid compound, without or along with a polyhydric alcohol and/or a fatty acid, and reacting 100 parts by weight of the resulting nitrogen-containing resin about 1 to about 50 parts by weight of with the epoxy resin, said amine compound being at least one compound selected from the group consisting of 1) an amine compound having primary amino and/or secondary amino and represented by the formula (I)

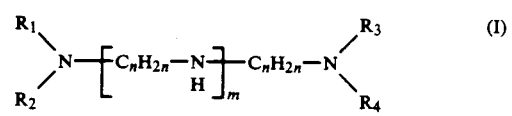

wherein $R_1$, $R_2$, $R_3$ and $R_4$ are the same or different and are each a hydrogen atom, alkyl, aryl or cycloalkyl, n is an integer of 1 to 4, and m is an integer of 0 to 4, provided that when m is 0, at least two of $R_1$, $R_2$, $R_3$ and $R_4$ is a hydrogen atom, 2) an alkanol amine compound having one hydroxyl group, and primary amino or secondary amino in the molecule and represented by the formula (II)

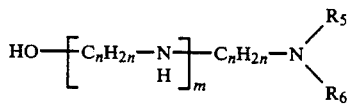 (II)

wherein $R_5$ and $R_6$ are the same or different and are each a hydrogen atom, alkyl, aryl or cycloalkyll, and n and m are as defined above, provided that when m is 0, at least one of $R_5$ and $R_6$ is a hydrogen atom and 3) a polyvalent alkanol amine compound having at least two hydroxyl groups in the molecule and represented by the formula (III)

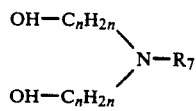 (III)

wherein $R_7$ is a hydrogen atom, alkyl, aryl, cycloalkyl or $-CK_nH_{2n}-OH$ group, and n is as defined above.

2. A composition as defined in claim 1, wherein said resulting nitrogen-containing resin is a resin obtained by subjecting to a condensation reaction a polybasic acid compound and an amine compound having at least two active hydrogen atoms in the molecule on the average along with polyhydric alcohol and/or a fatty acid, the active hydrogen atoms being reactive with the carboxyl group of the polybasic acid compound.

3. A composition as defined in claim 1 wherein the amine compound is an alkanol amine compound represented by the formula (II) or (III).

4. A composition as defined in claim 2 wherein the fatty acid is an oil or the fatty acid thereof.

5. A composition as defined in claim 4 wherein the fatty acid is one of a drying oil, semi-drying oil and the fatty acid of each of the oils.

6. A composition as defined in claim 1 wherein the epoxy resin is one of a polyepoxide having at least two epoxy groups per molecule on the average, and a modified polyepoxide having at least one epoxy group per molecule on the average and obtained by modifying with a monobasic acid the above polyepoxide having at least two epoxy groups per molecule on the average.

7. A composition as defined in claim 6 wherein the polyepoxide has a number average molecular weight of 320 to 8000.

8. A composition as defined in claim 7 wherein the number average molecular weight is 800 to 4000.

* * * * *